UNITED STATES PATENT OFFICE.

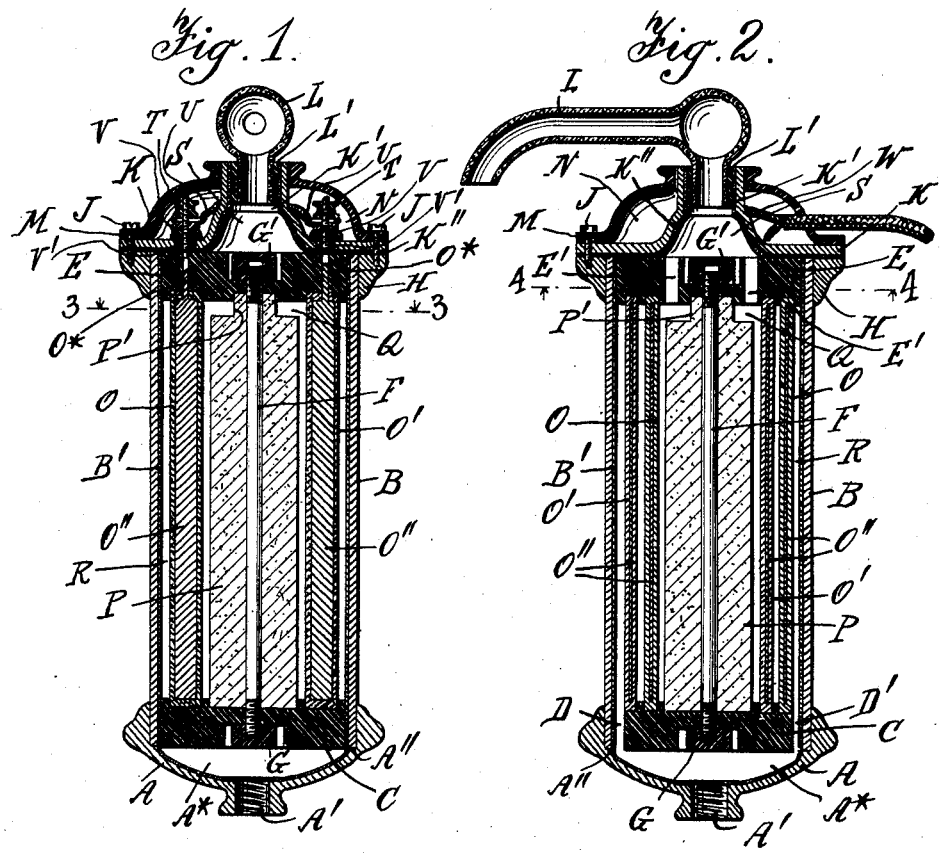
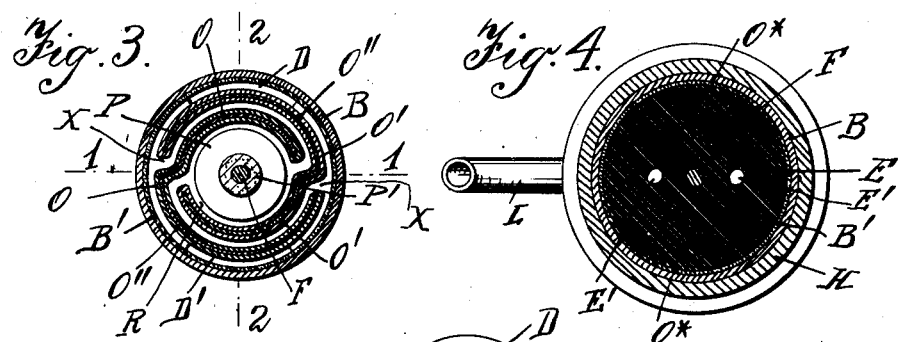
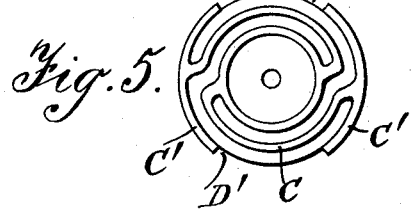

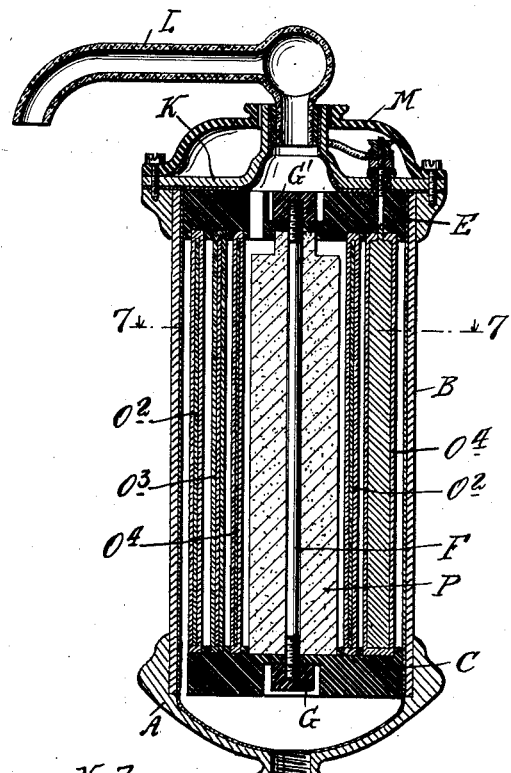
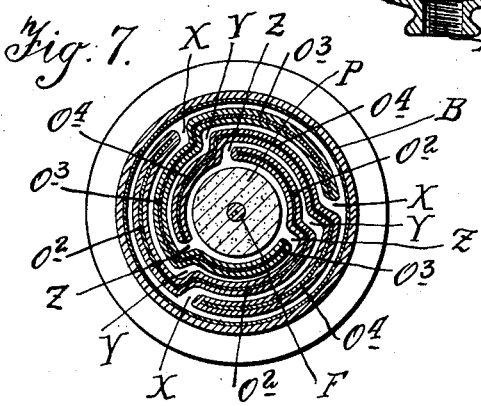
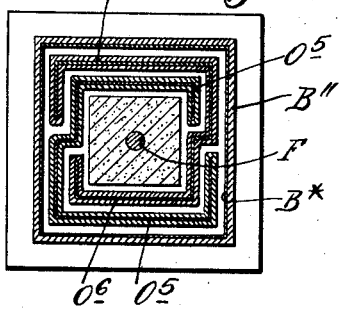

LUIS G. ABOGADO, OF MEXICO, MEXICO.

APPARATUS FOR STERILIZING LIQUIDS.

1,382,158.           Specification of Letters Patent.    Patented June 21, 1921.

Application filed June 4, 1919. Serial No. 301,772.

*To all whom it may concern:*

Be it known that I, LUIS G. ABOGADO, citizen of Mexico, residing at Calle Independencia No. 17, Mexico city, Mexico, have invented certain new and useful Improvements in Apparatus for Sterilizing Liquids, of which the following is a specification.

This invention relates to an apparatus for sterilizing liquids, and particularly for the sterilization of drinking water, by the action of an electric current. The object of my invention is to secure the above-indicated result with great efficiency and with a comparatively low consumption of current. The electrodes of my new apparatus have their liquid-engaging surfaces made of a substance not affected electrolytically, for instance carbon, and other parts of the apparatus which form liquid-containing walls, are preferably coated with a protective lining of enamel or other suitable material to prevent contact of the liquid with such metal parts, and electrolytic action on them.

In the accompanying drawings I have illustrated three forms of apparatus constructed according to my invention. Figure 1 is a vertical section, on line 1—1 of Fig. 3, showing one form of such apparatus; Fig. 2 is a vertical section on line 2—2 of Fig. 3; Figs. 3 and 4 are horizontal sections on lines 3—3 and 4—4 respectively of Figs. 1 and 2, respectively; Fig. 5 is a top view of the bottom head or plug employed in this form of apparatus; Fig. 6 is a vertical central section through another form of the apparatus, in a plane corresponding to that of Fig. 2; Fig. 7 is a cross section on line 7—7 of Fig. 6; and Fig. 8 is a similar cross section of a third form of apparatus embodying my present invention.

In Figs. 1 to 5 inclusive, I have shown an apparatus which comprises a bottom casing A, of circular or other suitable cross section, made of metal or other appropriate material, and provided with an inlet A' which may be screw-threaded as shown for convenient connection with the threaded end of a liquid-supply pipe (not shown, which pipe would be fitted with a cock or valve to regulate and shut off the flow of liquid. A cylindrical shell B is seated with its lower edge on a circumferential internal shoulder A'' of the casing A, and the inner surface of said shell is provided with a coating or lining B' of enamel, porcelain or other material which will protect the metal shell from oxidation, to which it would be exposed owing to chemical and electrolytic action if the water or other liquid were allowed to come in contact with the metal surface of the shell. In the lower portion of the shell is located a lower head or plug C, formed with spaced segmental extensions C' engaging the inner surface of the shell lining B', while the intervening portions of the head are out of contact with the shell lining B', thus leaving two segmental passages D, D', see Figs. 3 and 5, in permanent communication with a chamber A* formed in the casing A below the head or plug C. The upper end of the shell B receives an upper head or plug E, similar to the head C, but having its entire circumference in engagement with the inner surface of the shell lining B'. Each of these heads is made with a central aperture through which passes a longitudinal rod F threaded at its ends to receive nuts G, G' fitted into suitable recesses in the outer faces of said heads, the latter being connected by said rod and nuts. The nuts are preferably made of insulating material, or at least of non-metallic material, and with closed outer ends, to keep the liquid from contact with the metal rod F. The upper end of the shell B is connected with a ring H, secured, as by screws J, to a cap K provided with an outlet K', which may be provided with any suitable means for carrying away the sterilized liquid; in Figs. 1, 2 and 4 I have indicated a glass outlet pipe L fitted into a rubber bushing L' located at the outlet K'. The ring H with the cap K corresponds to the casing A, and these parts H, K form an upper casing. The inner or lower surface of the cap K is made with a lining K'' of enamel or other suitable material, to keep the water from contact with said cap, in case the latter is made of metal which might be affected injuriously by chemical or electrolytic action if allowed to come in contact with the water. The screws J also serve to hold in place, an additional cap M, of insulating material, forming with the cap K a chamber N.

Between the heads C, E, which are made of insulating material, are located the two electrodes O, O', which are alike in shape, each of them comprising two cylinder segments of different diameters connected by a bend lying substantially in an axial plane, said segments being co-axial with the shell B. I prefer to make each of the electrodes of a core O″ consisting say of a copper plate, and embedded in a body of carbon or like conducting material indifferent to the action of the electric current and of the water or other liquid to be sterilized. This body forms a lining for the copper plate or core on both sides thereof, as well as at the vertical edges, and even the horizontal upper and lower edges of the electrodes may be covered by such lining, as shown. The said upper and lower edges of the electrodes are fitted into corresponding grooves in the opposing surfaces of the heads C, E, and the large-diameter portion of one electrode is placed adjacent to the small diameter portion of the other electrode, so that these portions will be parallel and very close together. The spacing of the overlapping electrode portions is uniform at all points of the electrodes. Between the rod F and the electrodes a cylindrical heat-retaining body P of carbon or other suitable material is fitted its base and its reduced upper end P′ entering suitable central recesses in the opposing faces of the head C, E. It will be seen that this heat-retaining body P forms no part of the electric circuit, since said body is insulated from the electrodes O, O′ which surround it. Between the lower surface of the upper head and the main portion of the body P, an annular chamber Q is formed around the reduced portion P′, and this chamber communicates at every point of its periphery, with the annular chamber R in which the electrodes O, O′ are located, it being understood that there is an annular space or passage between the outer surface of the body P and the adjacent inner cylindrical surfaces of the electrodes, see Figs. 1 to 3. Apertures E′ in the head E connect the chamber Q with an outlet chamber S formed between the head E and the cap K. The bends of the two electrodes (connecting the two cylinder segments of the same electrode) are substantially in diametrical alinement, see Figs. 3 and 5, and at these bends I provide the electrodes, at their upper edges, with projections O* passing through the head E and threaded to receive nuts U. These nuts engage washers V, and where the projections O* extend through the cap K (generally made of metal), they are surrounded by insulating sleeves V′, which might be made integral with the (insulating) washers V. The wires W for supplying the current pass through a suitable aperture in the cap or cover M, and their ends are clamped against the nuts U by binding nuts T of well-known character, these terminals being contained in the chamber N, and protected by the cap M.

In operation, the electrodes are connected with a source of electricity furnishing a galvanic current, that is a current of relatively low voltage and comparatively high amperage, for example, five volts and 50 amperes. The water or other liquid having been turned on, passes through the inlet A′ into the chamber A″, and from there through the segmental passages D, D′ into the outer portion of the annular chamber R, adjacent to the shell B. The liquid will then flow in contact with the outer surfaces of the outer or large-diameter electrode segments, to reach upright slots X formed between the vertical edge of the outer segment of one electrode and the bend of the other electrode. Thereupon the liquid enters the space between the electrodes O, O′, and forms a film of uniform thickness engaged on opposite sides or faces by the electrodes, said film completing the circuit; that is to say, the current cannot flow until the liquid is in contact with both electrodes. The flow of the liquid is substantially in a helical or spiral path, being partly circumferential as indicated by the arrows, and partly longitudinal (upward, toward the outlet). After traveling in contact with both electrodes as just explained, in a film across which the electric current flows, the liquid will pass inwardly through upright slots Y formed between the free edges of the inner electrode segments and the bends of the other electrodes. The liquid thus reaches the annular space between the inner electrode segments and the heat-retaining body P, and from this portion of the chamber R the liquid enters the chamber Q adjacent to the head E, from whence it passes through the apertures E′ to the chamber S and the outlet pipe L. The current passing through the liquid exerts a heating and sterilizing action thereon, and the liquid is also heated by the heat produced in the electrodes by the passage of the current and then transferred to the liquid; a certain portion of this electrode heat may be transferred to the liquid even before the latter reaches the film space between the electrodes. It will be noted that in the operation described the cool water or other liquid is in contact with the inner lining B′ of the shell B, while the warmer liquid is nearer the center or axis of the apparatus; I thus practically prevent the loss of heat which might be due to radiation from the outer surface of the shell. Obviously, the temperature to which the liquid is heated, and also the sterilizing effect of the current, will depend on the time such liquid remains in the apparatus, and this may be controlled by opening more or less the cock in the liquid-supply pipe leading to the inlet A′. As the electrodes are very close to each other, and spaced uniformly, a very even and efficient heating and sterilizing action is obtained, and any whirling of the liquid in the space between the electrodes is avoided. The electrodes are of course of different potential at the time the current passes through the liquid between them. By providing the shell B and the cap K with protective linings such as B', K' respectively, I prevent the injury which might result to said parts, if made of metal, either by electrolysis or by a chemical action of the liquid. Similarly, since the electrode surfaces in contact with the liquid are indifferent or inert (non-metallic), the electrodes, and especially their cores O'', are protected against oxidation and electrolytic damage. Part of the heat developed in the apparatus will be absorbed by the heat-retaining body P, which thus becomes a heat-reservoir to equalize, and compensate for, any fluctuations in the heating and sterilizing effect which result or may result from irregularities in the flow of the liquid or of the electric current. The electrodes may be made of carbon molded by pressure upon and around the copper core O''.

If the supply of liquid is stopped, as by closing the cock in the liquid-supply pipe, the effect will be at first a moderate rise of the amperage, due to the fact that the liquid, now being stationary, is heated to a higher temperature, at which its conductivity is greater; this period of increased amperage is however very brief (generally a few seconds, and in any event not sufficient in amount or duration to burn out the metallic connections of the apparatus), and then follows a period of reduced amperage owing to the fact that the resistance is increasing progressively as the wetted surface area of the electrodes is diminished by the evaporation of the liquid. As the resistance continues to increase, the heating effect will finally become sufficient to cause the liquid to boil or evaporate, and when the entire amount of liquid in contact with the electrodes has evaporated, there will be no electrical connection between the electrodes, and the circuit will thus be broken automatically. Generally, the heating effect will be so adjusted that the apparatus will discharge a sterilized liquid at the outlet L; in special cases, however, it might be desired to obtain a sterilized vapor or steam, and a proper regulation of the liquid supply will adjust conditions to secure this result, that is to say, if the supply-cock is opened slightly, liquid may be admitted continuously through the inlet A' while steam or vapor is discharged continuously at the outlet L. The steam or vapor, whether produced during the continuous admission of liquid or after shutting off the supply, will travel in a spiral path, as does the liquid at the time it flows between the electrodes.

In the construction illustrated by Figs. 6 and 7, which is adapted for operation by a three-phase current, there are three electrodes $O^2$, $O^3$, $O^4$, each of the general step-like arrangement described in connection with the electrodes O, O', and also made, say of a carbon body pressed on and around a copper core. Each of the electrodes $O^2$, $O^3$, $O^4$, instead of comprising only two segments of different diameters, has three segments of this character, with intervening bends, and so arranged relatively to each other as to form three sets of upright slots X, Y, Z, the three slots of the same set being evenly spaced circumferentially (120° apart), and the outer segment of one electrode overlapping the intermediate segment of the next electrode, which intermediate segment again overlaps the inner segment of the third electrode. All these segments are concentric with the axis of the rod F. There are three terminals or binding posts, one for each of the electrodes. In other respects this construction, and its operation, are the same as described with reference to Figs. 1 to 5.

In Fig. 8 the shell B'' (with its inner lining B*) is rectangular instead of cylindrical, and the electrodes $O^5$, $O^6$, are given a corresponding shape. They have inert liquid-engaging surfaces, as before, say a carbon body on a copper core, and consist of portions of a substantially segmental nature arranged to overlap and to form a spiral path for the thin film of liquid traveling between the electrodes, the opposing, film-engaging faces of the electrodes being evenly spaced at all points of the film. In other respects, the construction indicated in Fig. 8 may agree with those first described, and its operation will be substantially the same as in Figs. 1 to 5.

Various modifications may be made without departing from the nature of my invention as set forth in the appended claims.

After the water has been sterilized as described, impurities contained therein may be removed in any suitable manner, say by attaching a filter to the outlet tube L, and compelling the water to pass through such filter.

I claim as my invention:

1. An electric sterilizer, comprising a casing having means for the admission and delivery of a liquid, and inert electrodes of like shape contained in said casing, each electrode comprising co-axial cylinder segments of different diameters and substantially radial portions connecting said segments, the segments of adjacent electrodes being in overlapping and underlapping arrangement respectively.

2. An electric sterilizer, comprising a casing forming a chamber adapted to contain a liquid, inert electrodes located in said chamber and overlapping stepwise, and a heat-retainer insulated from said electrodes and located in the central portion of said chamber so as to be surrounded by said electrodes.

3. An electric sterilizer, comprising a casing forming a chamber adapted to contain a liquid, inert electrodes located in said chamber and overlapping stepwise to form slit-like passages at the longitudinal electrode edges, and a heat-retainer insulated from said electrodes and located in the central portion of said chamber so as to be surrounded by said electrodes, said heat-retainer having its surface exposed to contact with the liquid flowing through said chamber.

4. An electric sterilizer, comprising a casing forming a chamber adapted to contain a liquid, inert electrodes in said chamber, means for admitting liquid to said chamber at one end, at the outer portion of such chamber, and for withdrawing liquid at the other end from the central portion of the casing, and a heat-retainer insulated from said electrodes and extending lengthwise in the central portion of said chamber so as to be surrounded by said electrodes.

5. An electric sterilizer, comprising a casing having means for the admission and delivery of a liquid, said casing being of cylindrical shape, and inert electrodes of like shape contained in said casing, each electrode comprising co-axial cylinder segments of different diameters, and substantially radial portions connecting such segments, the segments of adjacent electrodes being in overlapping and underlapping arrangement respectively, and spaced from each other radially to the same extent that the outer segments are spaced from the cylindrical inner surface of the casing, and the free edges of said segments being spaced from said radial connecting portions to the same distance as the one separating overlapping cylinder segments.

In testimony whereof I affix my signature.

LUIS G. ABOGADO.